United States Patent
Chen et al.

(10) Patent No.: US 12,491,669 B2
(45) Date of Patent: Dec. 9, 2025

(54) APPARATUS FOR MANUFACTURING SHOE MATERIAL WITH REAL-TIME TEMPERATURE MEASURING SYSTEM AND METHOD FOR MANUFACTURING SHOE MATERIAL

(71) Applicant: FENG TAY ENTERPRISES CO., LTD., Yunlin County (TW)

(72) Inventors: Yi-Lien Chen, Changhua County (TW); Yu-Liang Chang, Chiayi County (TW)

(73) Assignee: FENG TAY ENTERPRISES CO., LTD., Yunlin County (TW)

( * ) Notice: Subject to any disclaimer, the term of this patent is extended or adjusted under 35 U.S.C. 154(b) by 118 days.

(21) Appl. No.: 18/527,375

(22) Filed: Dec. 4, 2023

(65) Prior Publication Data
US 2025/0178250 A1 Jun. 5, 2025

(51) Int. Cl.
| | |
|---|---|
| *B29C 43/58* | (2006.01) |
| *B29C 43/04* | (2006.01) |
| *B29C 43/52* | (2006.01) |
| *B29K 105/04* | (2006.01) |
| *B29L 31/50* | (2006.01) |
| *G01K 1/14* | (2021.01) |
| *G01K 3/00* | (2006.01) |

(52) U.S. Cl.
CPC .............. *B29C 43/58* (2013.01); *B29C 43/04* (2013.01); *B29C 43/52* (2013.01); *G01K 1/146* (2013.01); *G01K 3/005* (2013.01); *B29C 2043/5816* (2013.01); *B29K 2105/04* (2013.01); *B29L 2031/504* (2013.01)

(58) Field of Classification Search
None
See application file for complete search history.

(56) References Cited

U.S. PATENT DOCUMENTS

| | | | | |
|---|---|---|---|---|
| 4,251,479 | A | * | 2/1981 | Pecht ..................... B29C 45/73 264/106 |
| 2012/0234069 | A1 | * | 9/2012 | Matsumoto ......... B29C 35/0288 72/342.1 |
| 2019/0308354 | A1 | * | 10/2019 | Chen ..................... B29C 45/78 |
| 2021/0229384 | A1 | * | 7/2021 | Takahashi ........... B29C 35/0288 |
| 2021/0354349 | A1 | * | 11/2021 | Archer ................. B29C 44/427 |

\* cited by examiner

*Primary Examiner* — Lina Cordero
(74) *Attorney, Agent, or Firm* — Apex Juris, pllc; Cera Oh

(57) ABSTRACT

An apparatus for manufacturing a shoe material with a real-time temperature measuring system and a method for manufacturing a shoe material are provided and include a real-time temperature measuring system used in hot-press molding and cooling shaping processes and configured to measure a real-time temperature of a foamed shoe material in a mold while a device performs a temperature controlling process on the mold. The real-time temperature is compared with a temperature threshold stored in a central controller. When the real-time temperature is greater than or is less than the temperature threshold, the central controller sends a control signal to stop the temperature controlling process on the mold by the device. Therefore, the manufacturing time of the shoe material in the hot-press molding and cooling shaping processes could be shortened, the production efficiency could be improved, and the energy consumption of the device could be reduced.

18 Claims, 11 Drawing Sheets

APPARATUS FOR MANUFACTURING SHOE MATERIAL WITH REAL-TIME TEMPERATURE MEASURING SYSTEM AND METHOD FOR MANUFACTURING SHOE MATERIAL

BACKGROUND OF THE INVENTION

Technical Field

The present invention relates generally to a technique of manufacturing a shoe material, and more particularly to an apparatus for manufacturing a shoe material with a real-time temperature measuring system and a method for manufacturing a shoe material.

Description of Related Art

It is known that a way for manufacturing a midsole from a foamed material is to grind a surface of a shoe material blank and then place the shoe material blank into a mold cavity of a mold of a device for heating and pressing to melt the surface of the shoe material blank for manufacturing the midsole with a predetermined shape and smoothly transferring a texture of an inner wall of the mold cavity to the surface of the shoe material blank; after the hot-press molding operation is completed, the mold is moved to a cold-press device, so that the shoe material blank with the surface having the texture can be cooled and shaped; after the cooling shaping operation is completed a molded product taken out from the mold is the midsole with the predetermined shape and the surface having the texture.

In the aforementioned way of manufacturing the shoe material, in order to ensure the quality of the shoe material, a heating temperature and a cooling temperature must be effectively controlled. Therefore, a way typically adopted in the industry is to manually embed a temperature sensing line into the mold to detect a temperature of the shoe material blank in the mold cavity, establish a corresponding relationship between the current "heating temperature or cooling temperature of the mold" and the "heating time or cooling time" through conversion based on the temperature detected, and then make a production standard serving as a production basis of the production unit. The production unit performs productions based on the temperature of the mold and the molding (shaping) time according to the converted corresponding relationship instead of a real-time temperature of the molded product in the mold. As a result, in order to ensure the production quality, the production unit often increases the heating time of the hot-press molding process so as to ensure that the molded product can reach the temperature of melting the material, and increases the cooling time of the cooling shaping process so as to ensure that the temperature of a middle of the thickest region of the molded product can be reduced to a temperature of solidifying the material. However, as a result, the production capacity is reduced and the energy consumption of the device is increased. Although some manufacturers design to perform the hot-press molding process and the cooling shaping process in different stations so as to improve the production efficiency, such design causes inconvenience in moving the mold and is time-consuming and energy-consuming.

In addition, in the process of manually embedding the temperature sensing line into the mold, the embedding operation is difficult and the temperature sensing line may be deviated when the mold is closed, so that an incorrect detection result is caused, thereby affecting the correctness of the production standard.

BRIEF SUMMARY OF THE INVENTION

In view of the above, the primary objective of the present invention is to provide an apparatus for manufacturing a shoe material with a real-time temperature measuring system and a method for manufacturing a shoe material, which could improve the production efficiency and reduce the energy consumption of a device.

The present invention provides a real-time temperature measuring system for manufacturing a shoe material and configured to measure a real-time temperature inside a foamed shoe material in a mold when a device performs a temperature controlling process on the mold. The real-time temperature measuring system is electrically connected to a central controller and includes at least one temperature-sensing rod and a signal connecting mechanism. The at least one temperature-sensing rod is configured to measure the real-time temperature inside the foamed shoe material while the mold is closed. The signal connecting mechanism includes a mold end base and a device end base, wherein the mold end base is engaged with the mold and has at least one contacted point electrically connected to the at least one temperature-sensing rod. The device end base is disposed on the device and has at least one contacting point, wherein the at least one contacting point is electrically connected to the central controller and is controlled to move between a first position and a second position. When the at least one contacting point is located at the first position, the at least one contacting point is not in contact with the at least one contacted point. When the at least one contacting point is located at the second position, the at least one contacting point is in contact with the at least one contacted point.

The present invention further provides an apparatus for manufacturing a shoe material with a real-time temperature measuring system, including a device, at least one mold, at least one real-time temperature measuring system, and a central controller. The device is provided with at least one work station. The at least one mold is mounted on the at least one work station of the device and includes at least one mold cavity and a mold cover configured to open or cover the at least one mold cavity. The at least one mold cavity is configured to dispose a foamed shoe material. The at least one mold is controlled to perform a temperature controlling process on the foamed shoe material. The at least one real-time temperature measuring system includes at least one temperature-sensing rod, a signal connecting structure, and a temperature capturing module. The at least one temperature-sensing rod is disposed on an inner surface of the mold cover of the at least one mold or a surface of the at least one mold cavity of the at least one mold. When the mold covers the at least one mold cavity, the at least one temperature-sensing rod is inserted into the foamed shoe material and measures a real-time temperature of the foamed shoe material. The signal connecting mechanism includes a mold end base and a device end base, wherein the mold end base is engaged with the mold and has at least one contacted point electrically connected to the at least one temperature-sensing rod. The device end base is disposed on the device and has at least one contacting point, wherein the at least one contacting point is controlled to move between a first position and a second position. When the at least one contacting point is located at the first position, the at least one contacting point is not in contact with the at least one contacted point. When the at least one contacting point is located at the second position, the at least one contacting point is in contact with the at least one contacted point. The temperature capturing module is electrically connected to the at least one contacting point of the device end base and includes a temperature analysis chip. When the at least one contacting point of the device end base is in contact with the at least one contacted point of the mold end base, the temperature capturing module converts an electrical signal measured by the at least one temperature-sensing rod into a temperature signal through the temperature analysis chip and sends the temperature signal. The central controller stores at least one temperature threshold and is configured to receive the temperature signal sent by the temperature capturing module. The central controller compares the real-time temperature measured by the at least one temperature-sensing rod with the at least one temperature threshold. When the real-time temperature is greater than or is less than the at least one temperature threshold, the central controller sends a control signal to stop the temperature controlling process on the at least one mold, that is, to stop a heating process or a cooling process of the at least one mold.

In addition, the present invention further provides a method for manufacturing a shoe material, configured to perform hot-press molding and cooling shaping on a foamed shoe material. The method includes: step A: obtaining a foamed shoe material with a skin layer of the foamed shoe material removed; step B: placing the foamed shoe material in a mold of a hot-press molding station of a device and performing hot-press molding, wherein the mold includes at least one temperature-sensing rod disposed on an inner surface of a mold cover of the mold or a surface of at least one mold cavity of the mold; step C: penetrating the surface of the foamed shoe material by the temperature-sensing rod, thereby the temperature-sensing rod extends into the foamed shoe material and measures a real-time temperature inside the foamed shoe material; step D: determining whether the real-time temperature in step C is greater than a first temperature threshold and sending a control signal to stop heating the mold when the real-time temperature is greater than the first temperature threshold; step E: sending a first control command according to the first control signal; the first control command controls a mold moving mechanism to move the mold from the hot-press molding station to a cooling shaping station of the device; step F: measuring the real-time temperature inside the foamed shoe material in the mold located in the cooling shaping station; step G: determining whether the real-time temperature in step F is less than a second temperature threshold and sending a second control signal to stop cooling the mold when the real-time temperature is less than the second temperature threshold; and step H: sending a second control command according to the second control signal; the second control command controls the mold moving mechanism to move the mold from the cooling shaping station to a subsequent processing station.

With the aforementioned design, the temperature-sensing rod is disposed on the inner surface of the mold cover of the mold or the surface of the mold cavity of the mold, so that the present invention could resolve the problem of manually embedding the temperature sensing line. Additionally, the real-time temperature of the molded product in the mold is measured and sent back to the central controller for determination, so that the temperature controlling process could be effectively controlled, thereby reducing the manufacturing time and the energy consumption of the device.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

A method for manufacturing a shoe material according to an embodiment of the present invention is configured to manufacture a midsole by using a real-time temperature measuring system while performing hot-press molding and cooling shaping on a foamed shoe material.

Figure 1:
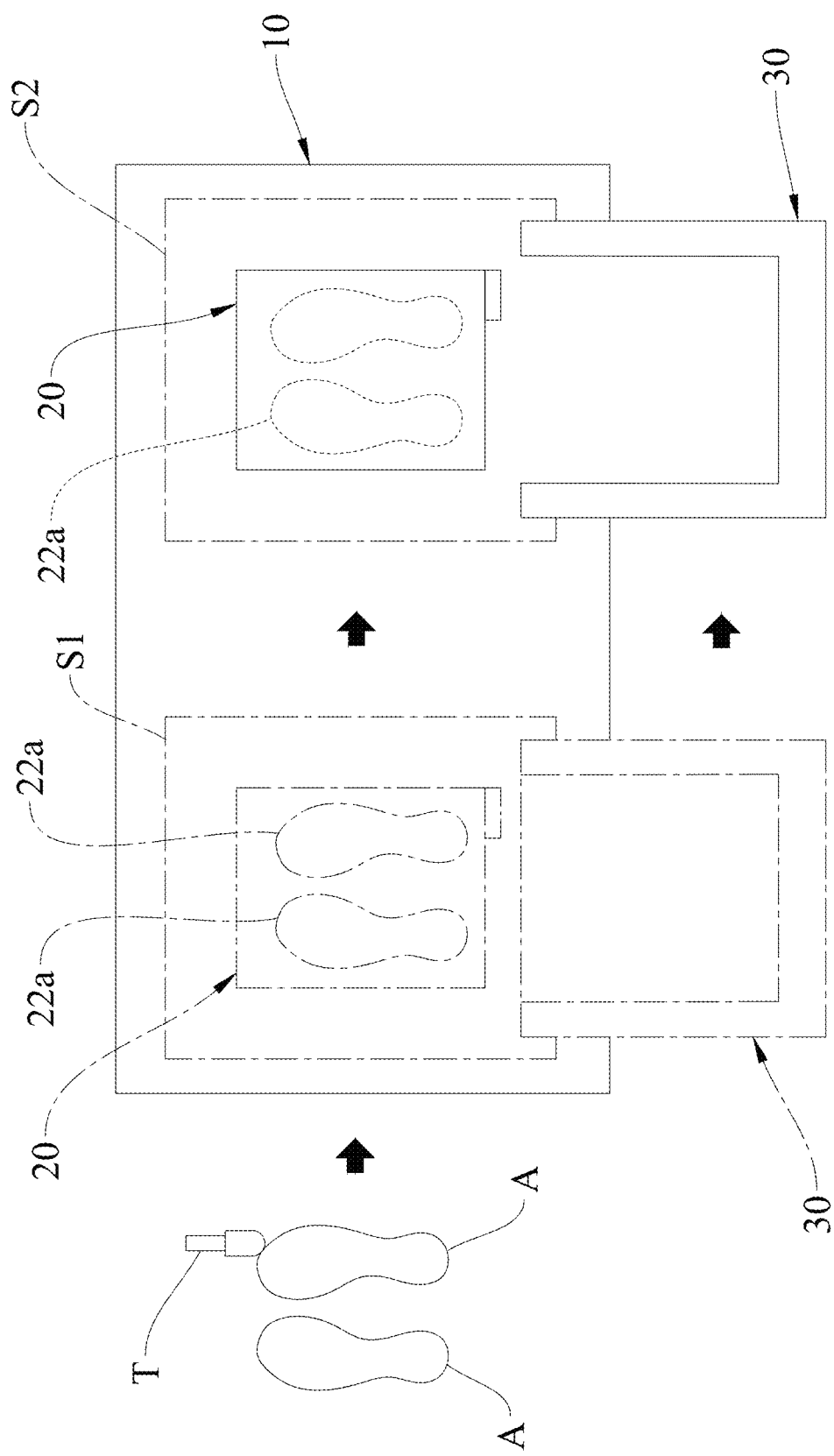
FIG. 1 is a schematic view of the structure to which the method for manufacturing the shoe material of the present invention is applied.
Figure 2B:
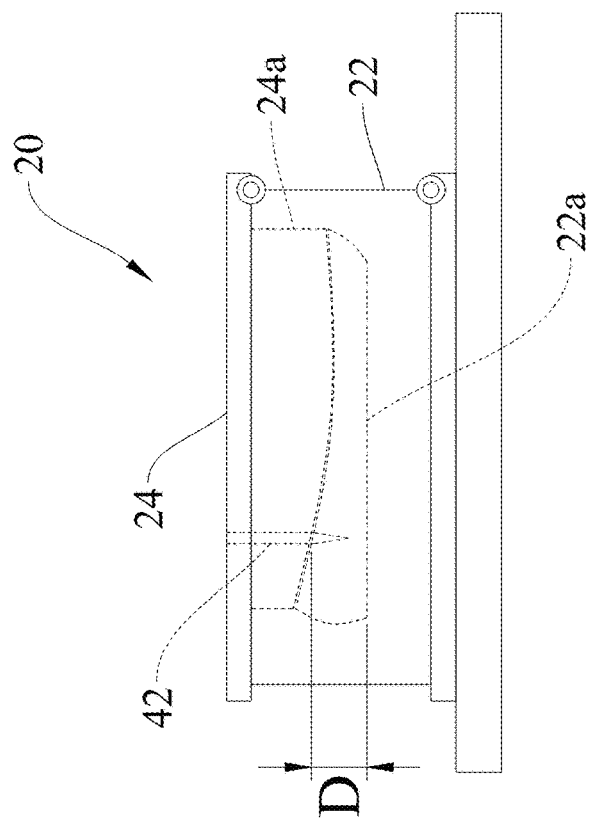
FIG. 2B is a schematic view, showing that the mold of the present invention for manufacturing the shoe material is closed.
Figure 2A:
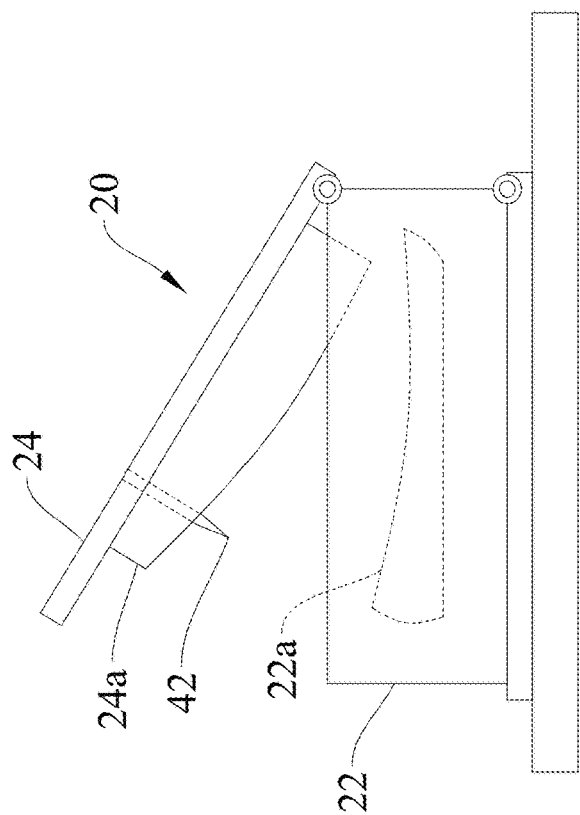
FIG. 2A is a schematic view, showing that the mold of the present invention for manufacturing the shoe material is opened.
Figure 3A:
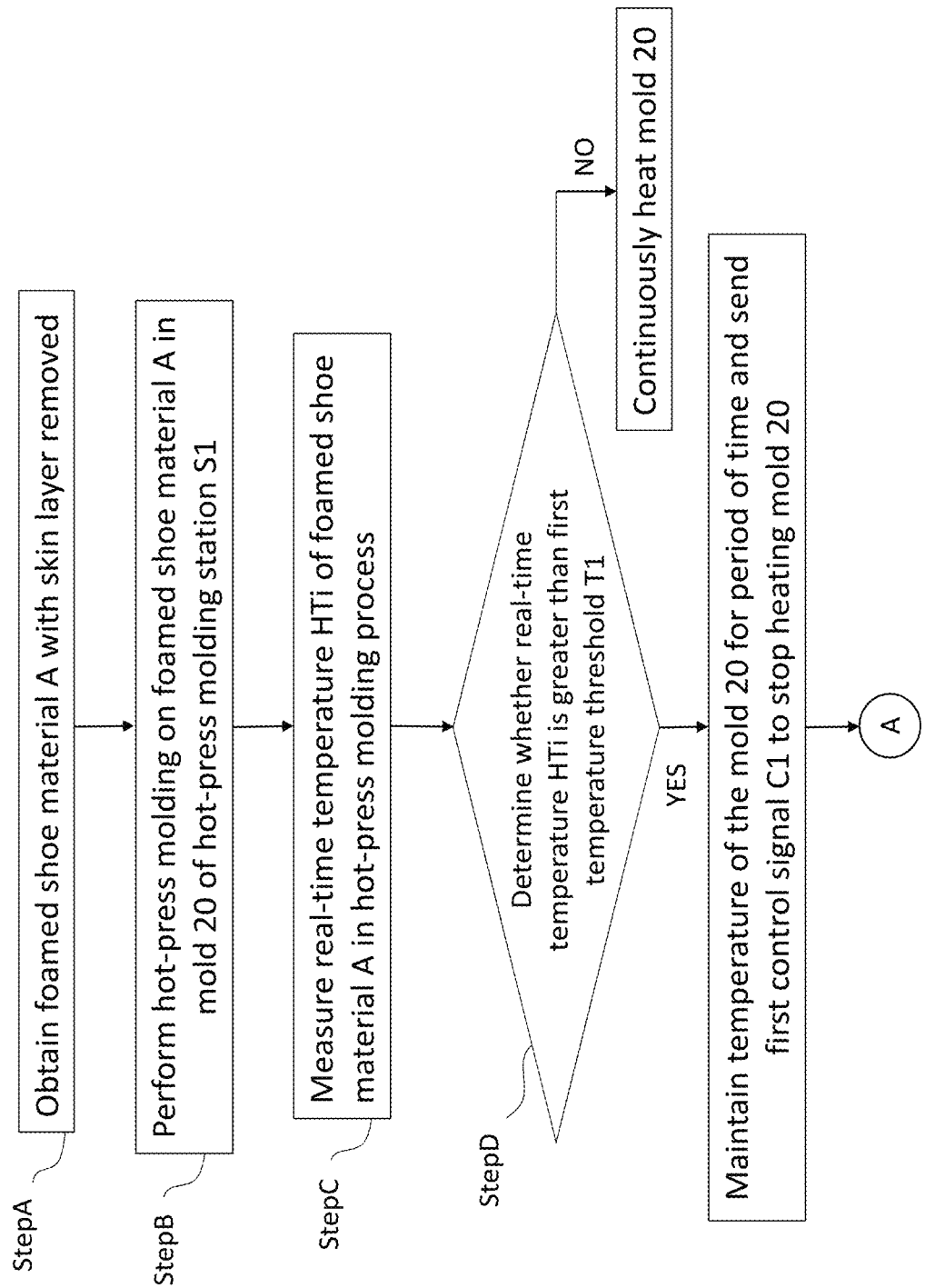
FIG. 3A and FIG. 3B are flow charts of the method for manufacturing the shoe material of the present invention.
Figure 3B:
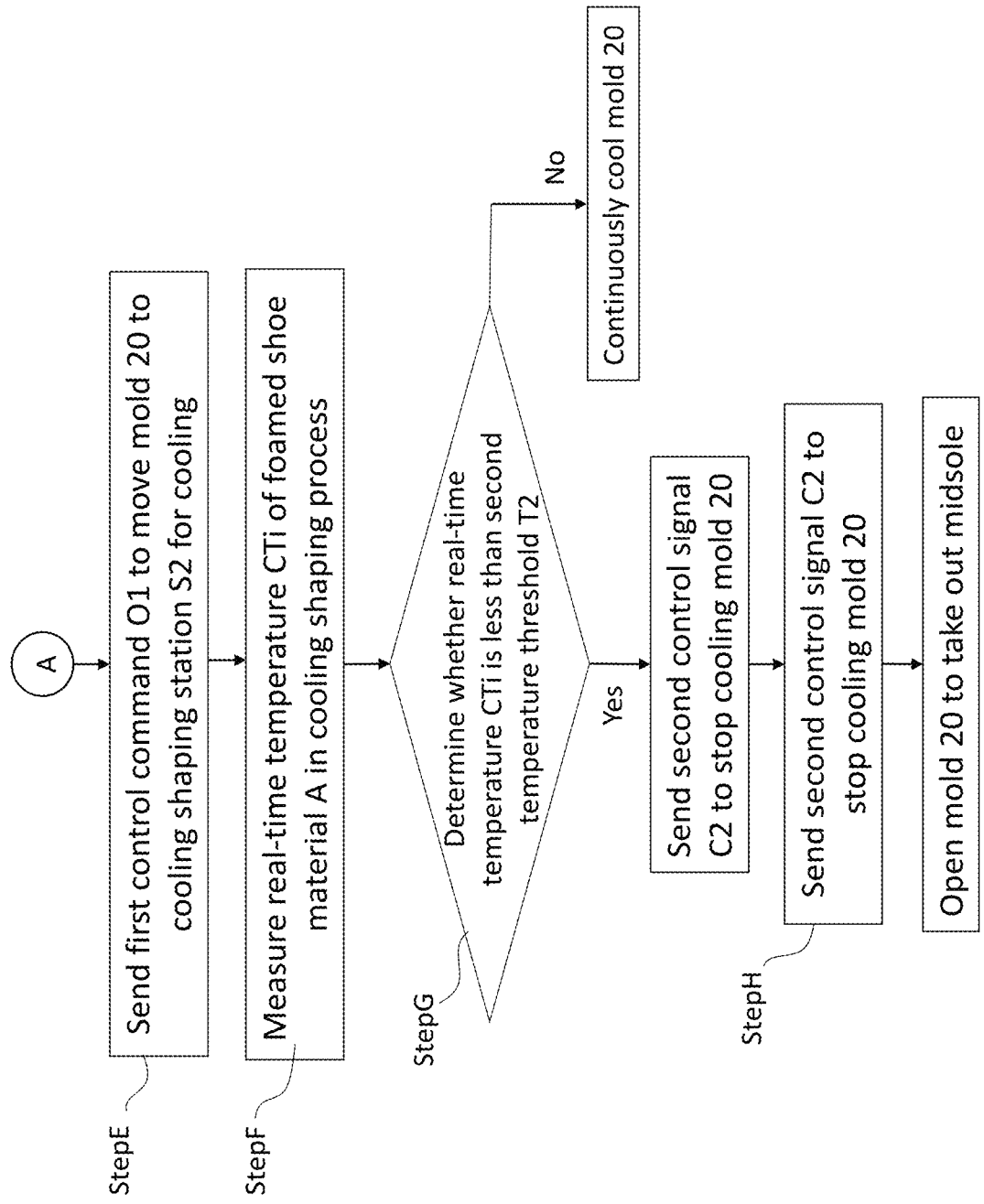

A structure to which the method for manufacturing the shoe material is applied is illustrated in FIG. 1, FIG. 2A, and FIG. 2B, wherein at least one work station is disposed on a device 10. A mold 20 is mounted on the at least one work station, wherein a foamed shoe material A could be placed into the mold 20. The mold 20 includes a mold base 22 and a mold cover 24, wherein the mold base 22 has a mold cavity 22a. The mold cover 24 is pivotally connected to the mold base 22 and could open or cover the mold cavity 22a. An inner surface of the mold cover 24 is provided with a mold core 24a. The foamed shoe material A is placed into the mold cavity 22a and is tightly pressed by the mold core 24a. In the current embodiment, the mold 20 is provided with two mold cavities 22a for placing the foamed shoe material A for forming midsoles of a left foot and a right foot; furthermore, the at least one work station includes a hot-press molding station S1 and a cooling shaping station S2. Flow charts of the method for manufacturing the shoe material are illustrated in FIG. 3A and FIG. 3B.

Step A: a foamed blank is injected by an injection machine, or a foamed flat plate is cut by a conventional cutter mold into a required blank shape and then a surface of the blank is grinded by a tool T, thereby obtaining the foamed shoe material A. A material of the foamed shoe material A includes, but is not limited to, ethylene vinyl acetate (EVA).

Step B: the foamed shoe material A is placed in the mold 20 of the hot-press molding station S1 of the device 10 and hot-press molding is performed on the foamed shoe material A. In step B, the mold 20 is heated to melt a surface of the foamed shoe material A, so that a texture of an inner wall of the mold cavity 22a of the mold 20 could be transferred to the surface of the foamed shoe material A.

Step C: a real-time temperature HTi inside the foamed shoe material A in the mold 20 is measured in the hot-press molding process.

Step D: whether the real-time temperature HTi in Step C is greater than a first temperature threshold T1 is determined; when the real-time temperature HTi is less than the first temperature threshold T1, the mold 20 is continuously heated; when the real-time temperature HTi is greater than the first temperature threshold T1, a first control signal C1 is sent to stop heating the mold 20. Preferably, when the real-time temperature HTi is greater than the first temperature threshold T1, the real-time temperature HTi is maintained for about 30 seconds to 5 minutes before the first control signal C1 is sent. The time from 30 seconds to 5 minutes is defined as a molding time, wherein the purpose of the molding time is to stabilize a texture on the surface of the foamed shoe material A. When the foamed shoe material A includes an EVA formulation, the first temperature threshold T1 is between 100° C. and 150° C. In the current embodiment, the first temperature threshold T1 is 115° C. is taken as an example.

Step E: a first control command O1 is sent according to the first control signal C1. The first control command O1 controls a mold moving mechanism 30 by the device 10 to automatically move the mold 20 from the hot-press molding station S1 to the cooling shaping station S2 of the device 10 for cooling the mold 20 to shape the foamed shoe material A inside the mold 20.

Step F: a real-time temperature CTi in the foamed shoe material A in the mold 20 located in the cooling shaping station S2 is measured.

Step G: whether the real-time temperature CTi in step F is less than a second temperature threshold T2 is determined, wherein the first temperature threshold T1 is greater than the second temperature threshold T2; when the real-time temperature CTi is greater than the second temperature threshold T2, the mold 20 is continuously cooled; when the real-time temperature CTi is less than the second temperature threshold T2, a second control signal C2 is sent to stop cooling the mold 20. Step G is to ensure the foamed shoe material A is shaped; therefore, a cooling temperature is required to be less than a softening point of the material formulated. In the current embodiment, the second temperature threshold T2 is 30° C.

Step H: a second control command O2 is sent according to the second control signal C2. The second control command O2 controls the mold moving mechanism 30 by the device 10 to automatically move the mold 20 from the cooling shaping station S2 to a subsequent processing station for opening the mold 20 to take out a molded product, that is, the midsole.

The method for manufacturing the shoe materials according to the embodiment of the present invention is described as the above, wherein the first temperature threshold T1 and the second temperature threshold T2 of the method are determined by differential scanning calorimetry (DSC). In practice, temperature thresholds could be determined by using other thermal analysis technologies. The real-time temperature measuring system configured to measure the temperature inside the foamed shoe material is described as below, and then an apparatus for manufacturing a shoe material configured to perform all of the steps of the method for manufacturing the shoe material is described.

Figure 4:
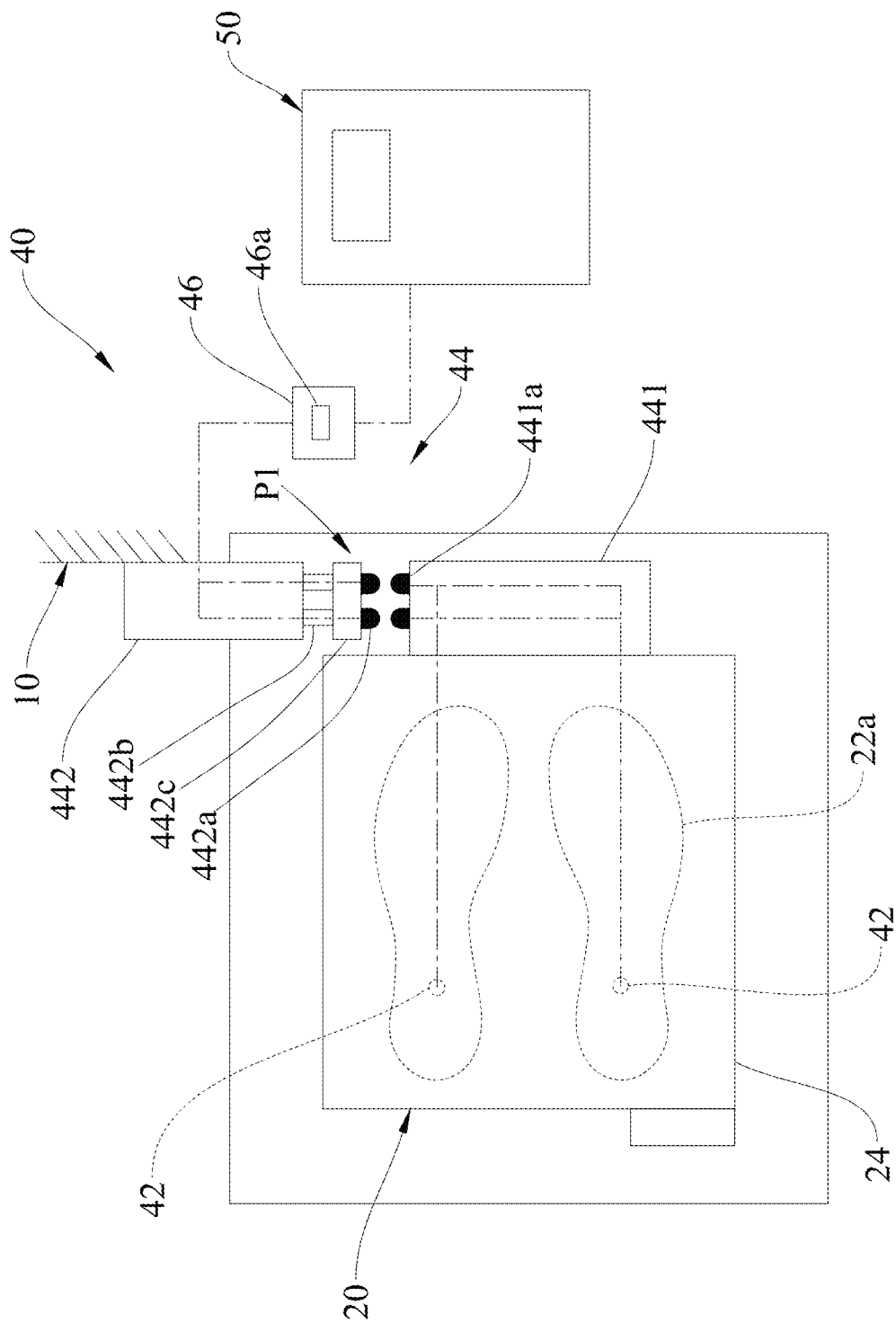
FIG. 4 is a schematic top view of the mold and the real-time temperature measuring system for manufacturing the shoe material, showing that the signal connecting mechanism is not electrically connected.
Figure 5:
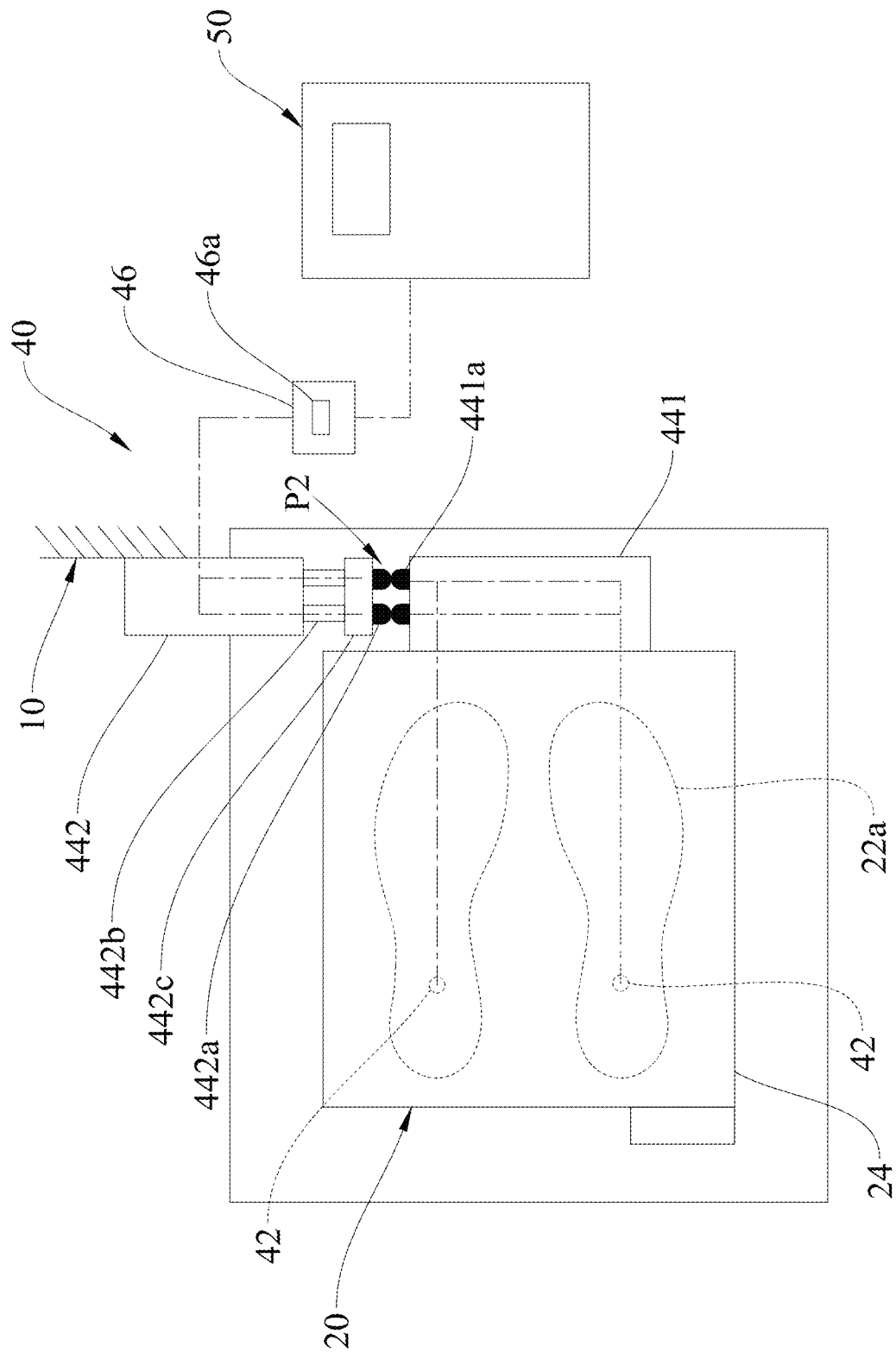
FIG. 5 is a schematic top view of the mold and the real-time temperature measuring system for manufacturing the shoe material, showing that the signal connecting mechanism is electrically connected.

Referring to FIG. 4 and FIG. 5, the present invention provides a real-time temperature measuring system 40 manufacturing the shoe material. The real-time temperature measuring system 40 is electrically connected to a central controller 50. The real-time temperature measuring system 40 is configured to measure the real-time temperature inside the foamed shoe material A in the mold 20 when the device 10 performs a temperature controlling process on the mold 20. It is noted that when the mold 20 is mounted on the hot-press molding station S1, a temperature inside the foamed shoe material A is the real-time temperature HTi; when the mold 20 is mounted on the cooling shaping station S2, the temperature measured inside the foamed shoe material A is the real-time temperature CTi.

Figure 6:
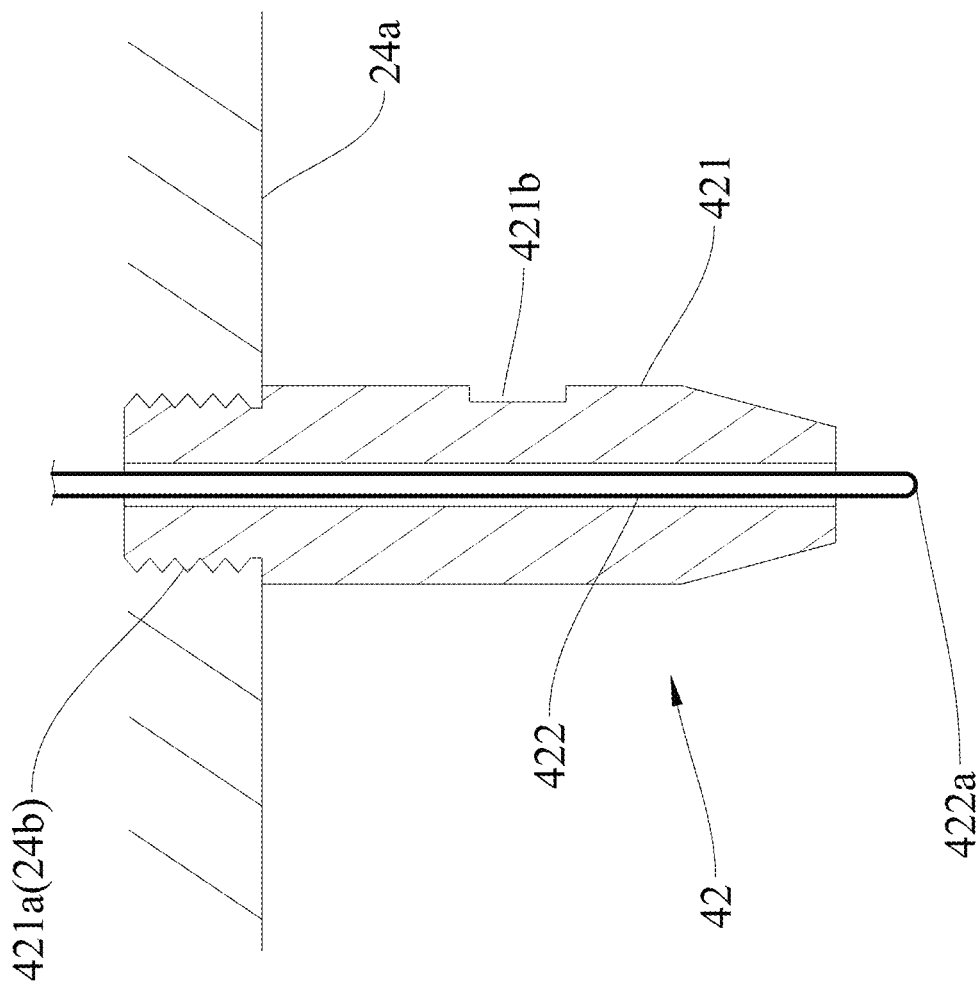
FIG. 6 is a sectional view of the temperature-sensing rod of the real-time temperature measuring system according to an embodiment of the present invention.

In an embodiment, the real-time temperature measuring system 40 includes at least one temperature-sensing rod 42, a signal connecting mechanism 44, and a temperature capturing module 46. In the current embodiment, the at least one temperature-sensing rod 42 includes two temperature-sensing rods 42 corresponding to the two mold cavities 22a and respectively arranged in one of the two mold cavities 22a; the temperature-sensing rods 42 are configured to measure the real-time temperature inside the foamed shoe material A when the mold 20 is closed. In other embodiments, only one temperature-sensing rod 42 could be correspondingly arranged in one of the mold cavities 22a. As shown in FIG. 2A, FIG. 2B, and FIG. 6, the temperature-sensing rod 42 is disposed on the inner surface of the mold cavity 24 of the mold 20 and includes a heat-insulating sleeve 421 and a thermocouple 422, wherein the heat-insulating sleeve 421 is detachably fixed on a surface of the mold core 24a of the mold cavity 24. In an embodiment, a threaded section 421a on an end of the heat-insulating sleeve 421 is screwed into a screw hole 24b of the mold core 24a, so that the heat-insulating sleeve 421 is detachably fixed on the surface of the mold core 24a of the mold cavity 24; preferably, a body of the heat-insulating sleeve 421 is provided with an engaging portion 421b with a non-circular section, and a tool (not shown) is engaged with the engaging portion 421b to easily drive the heat-insulating sleeve 421 to rotate, thereby fastening the heat-insulating sleeve 421 to the mold cover 24 or disengaging the heat-insulating sleeve 421 from the mold cover 24 easily. The thermocouple 422 is a loop formed by connecting two different metals. The thermocouple 422 penetrates through the heat-insulating sleeve 421, wherein a portion of the thermocouple 422 extends out of the heat-insulating sleeve 421 to form a measurement end 422a. When the mold cover 24 covers the mold cavity 22a, the temperature-sensing rod 42 is partially inserted into the foamed shoe material A, that is, the heat-insulating sleeve 421 and the thermocouple 422 penetrate through the surface of the foamed shoe material A and the measurement end 422a of the thermocouple 422 is in contact with an inner portion of the foamed shoe material A to directly measure the real-time temperature of the foamed shoe material. The temperature-sensing rod 42 is disposed on the inner surface of the mold 20 to measure the real-time temperature of the foamed shoe material A as an example; however, the temperature-sensing rod could be changed to be disposed on a surface of the mold cavity of the mold (not shown), that is, the measurement end of the temperature-sensing rod protrudes into the mold cavity before the mold is closed, which could also achieve the purpose of measuring the real-time temperature of the foamed shoe material A; in this case, the inner face of the mold cover could be provided without the temperature-sensing rod.

In an example, the foamed shoe material A has a maximum thickness D (referring to FIG. 2B), wherein the maximum thickness D typically refers to a thick portion of the foamed shoe material A near a shoe heel but not a tail end or a peripheral portion. The heat-insulating sleeve 421 and the thermocouple 422 penetrate through the surface of the foamed shoe material A and extend into about 20% to 80% of the maximum thickness D so as to measure the real-time temperature inside the foamed shoe material A; preferably, the heat-insulating sleeve 421 and the thermocouple 422 extend into 40% to 60% of the maximum thickness D of the foamed shoe material A; most preferably, the heat-insulating sleeve 421 and the thermocouple 422 extend into 50% of the maximum thickness D of the foamed shoe material A.

The signal connecting mechanism 44 includes a mold end base 441 and a device end base 442. The mold end base 441 is engaged with the mold 20 and has at least one contacted point 441a electrically connected to the temperature-sensing rod 42. In the current embodiment, the mold end base 441 is detachably engaged with the mold 20, and the at least one contacted point 441a includes two groups of contacted points 441a respectively corresponding to one of the two temperature-sensing rods 42, that is, the thermocouple 422 of each of the temperature-sensing rods 42 has two contacts, and each of the two groups of contacted points 441a includes two contacted points 441a and is electrically connected to two contacts of the thermocouple 422 of one of the two temperature-sensing rods 42; as FIG. 4 and FIG. 5 are schematic top views and the two groups of contacted points 441a are vertically overlapped, only one group of the contacted points 441a can be seen in FIG. 4 and FIG. 5. The device end base 442 is disposed on the device 10 and has at least one contacting point 442a electrically connected to the central controller 50 through the temperature capturing module 46; the number of the contacting point 442a corresponds to the number of the contacted point 441a to be four; as the contacting points 442a are vertically overlapped, only one of the two groups of contacting points 442a can be seen in FIG. 4 and FIG. 5. The contacting point 442a is movable between a first position P1 shown in FIG. 4 and a second position P2 shown in FIG. 5. When the contacting point 442a is located at the first position P1, the contacting point 442a is not in contact with the contacted point 441a; when the contacting point 442a is located at the second position P2, the contacting point 442a is in contact with the contacted point 441a. In the current embodiment, the device end base 442 further includes a moving rod 442b and two moved blocks 442c which are connected at an end of the moving rod 442b and are vertically overlapped, wherein each of the two groups of contacting points 442a is provided on one of the two moved blocks 442c; the moving rod 442b is controlled to move linearly to drive the contacting points 442a to move between the first position P1 and the second position P2. It is noted that the mold end base 441 is engaged with the mold 20 and is moved along with the mold 20, and the device end base 442 is fixedly disposed on the device 10.

The temperature capturing module 46 includes a temperature analysis chip 46a and is electrically connected to the at least one contacting point 442a of the device end base 442 and the central controller 50. When the at least one contacting point 442a of the device end base 442 is in contact with the at least one contacted point 441a of the mold end base 441, the temperature capturing module 46 converts an electrical signal measured by the at least one temperature-sensing rod 42 into a temperature signal through the temperature analysis chip 46a and sends the temperature signal.

The central controller 50 is configured to receive the temperature signal sent by the temperature capturing module 46. The central controller 50 stores at least one temperature threshold and compares the real-time temperature measured by the at least one temperature-sensing rod 42 with the at least one temperature threshold; when the real-time temperature is greater than or is less than the at least one temperature threshold, the central controller 50 sends a control signal, and the device 10 stops performing the temperature controlling process on the mold 20 according to the control signal. As described in the aforementioned method when the device 10 includes the hot-press molding station S1 and the cooling shaping station S2, the at least one temperature threshold of the central controller 50 includes the first temperature threshold T1 and the second temperature threshold T2. When the real-time temperature HTi measured inside the foamed shoe material A of the hot-press molding station S1 is greater than the first temperature threshold T1, the central controller 50 controls to stop heating the mold 20; when the real-time temperature CTi measured inside the foamed shoe material A of the cooling shaping station S2 is less than the second temperature threshold T2, the central controller 50 controls to stop cooling the mold 20.

The above is the description of the configuration of the real-time temperature measuring system 40 for manufacturing the shoe material and the central controller 50. Since the real-time temperature measuring system 40 measures the real-time temperature inside the foamed shoe material A in the mold 20 of the hot-press molding station S1 and/or the cooling shaping station S2, the production standard of a reasonable shaping temperature could be determined to serve as the production basis of the production unit, and the real-time temperature measuring system 40 could be mounted on different production devices in practice to achieve the real-time temperature measurement and the process control of the devices for massive production of the shoe materials. In this way, the time-consuming and energy-consuming problem of the conventional way, which is required to increase the heating time to ensure that the temperature of the molded product reaches the temperature of melting the material and to increase the cooling time to ensure that the temperature of the molded product reaches the temperature of solidifying the material for ensuring production quality, could be resolved.

In addition, the at least one temperature sensing rod 42 of the real-time temperature measuring system 40 is disposed on the inner surface of the mold cover 24 or the surface of the mold cavity 22a in advance and is inserted into the foamed shoe material A in a penetrating manner to accurately measure the temperature inside the foamed shoe material A, so that the production standard could be made correctly and the real-time temperature measurement and the process control of the devices for massive production of the shoe materials could be achieved, thereby resolving the problem of the inconvenience in manually embedding the temperature-sensing line into the mold and the inaccurate measurement result due to derivation of the temperature-sensing line in the conventional way. Furthermore, the heat-insulating sleeve 421 of the temperature-sensing rod 42 could insulate most of the temperature from the mold 20 so as to ensure the accuracy of the temperature of the foamed shoe material A measured by the thermocouple 422.

Figure 7:
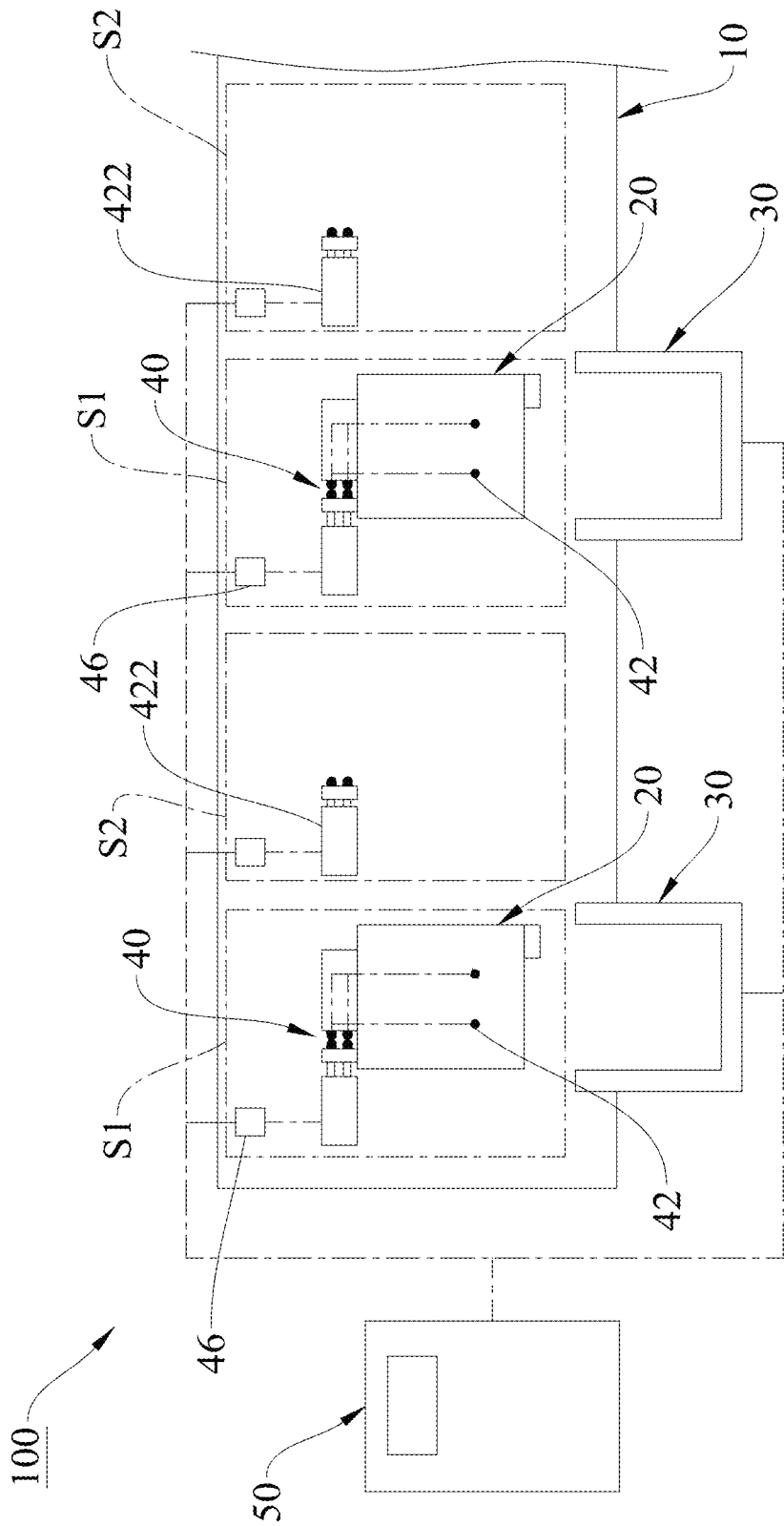
FIG. 7 is a schematic view of the apparatus for manufacturing the shoe material according to the embodiment of the present invention, showing that the mold is mounted on the hot-press molding station.

The apparatus for manufacturing the shoe material configured to perform all of the steps of the method for manufacturing the shoe material is described below. An apparatus for manufacturing a shoe material 100 according to the embodiment of the present invention is illustrated in FIG. 7 and includes the device 10, the mold 20, the mold moving mechanism 30, the real-time temperature measuring system 40, and the central controller 50. The device 10 could be provided with a plurality of hot-press molding stations S1 and a plurality of cooling shaping stations S2 at the same time, wherein the hot-press molding stations S1 and the cooling shaping stations S2 are adjacently arranged. The mold 20 could be mounted on each of the hot-press molding stations S1 and each of the cooling shaping stations S2 at the same time; the mold 20 could also be mounted on the hot-press molding stations S1 at first, and then the mold 20 in the hot-press molding stations S1 is moved to the cooling shaping stations S2 at a proper time; therefore, each of the hot-press molding stations S1 and each of the cooling shaping stations S2 could cooperatively work with one mold moving mechanism 30, or only one mold moving mechanism 30 could be provided to efficiently move the molds 20 in the work stations.

In order to illustrate easily, the mold 20 is firstly mounted on the hot-press molding station S1, and then the central controller 50 controls the mold moving mechanism 30 by the device 10 to move the mold 20 to the cooling shaping station S2 as an example for illustration. Referring to FIG. 7, each of the hot-press molding stations S1 is provided with a mold 20 and each of the cooling shaping stations S2 is provided without a mold 20; at that time, when the device 10 heats the mold 20, the real-time temperature measuring system 40 is in a state shown in FIG. 5, that is, the contacting points 442a of the device end base 442 is controlled to move forward and to be in contact with the contacted points 441a of the mold end base 441; the central controller 50 receives the temperature signal sent by the temperature capturing module 46 and compares the real-time temperature HTi measured by the temperature-sensing rod 42 with the first temperature threshold T1 stored; when the real-time temperature HTi is greater than the first temperature threshold T1, the real-time temperature HTi is maintained for about 30 seconds to 5 minutes to stabilize the texture on the surface of the foamed shoe material A in the mold 20, and then the first control signal C1 is sent to stop heating the mold 20 by the device 10.

Figure 8:
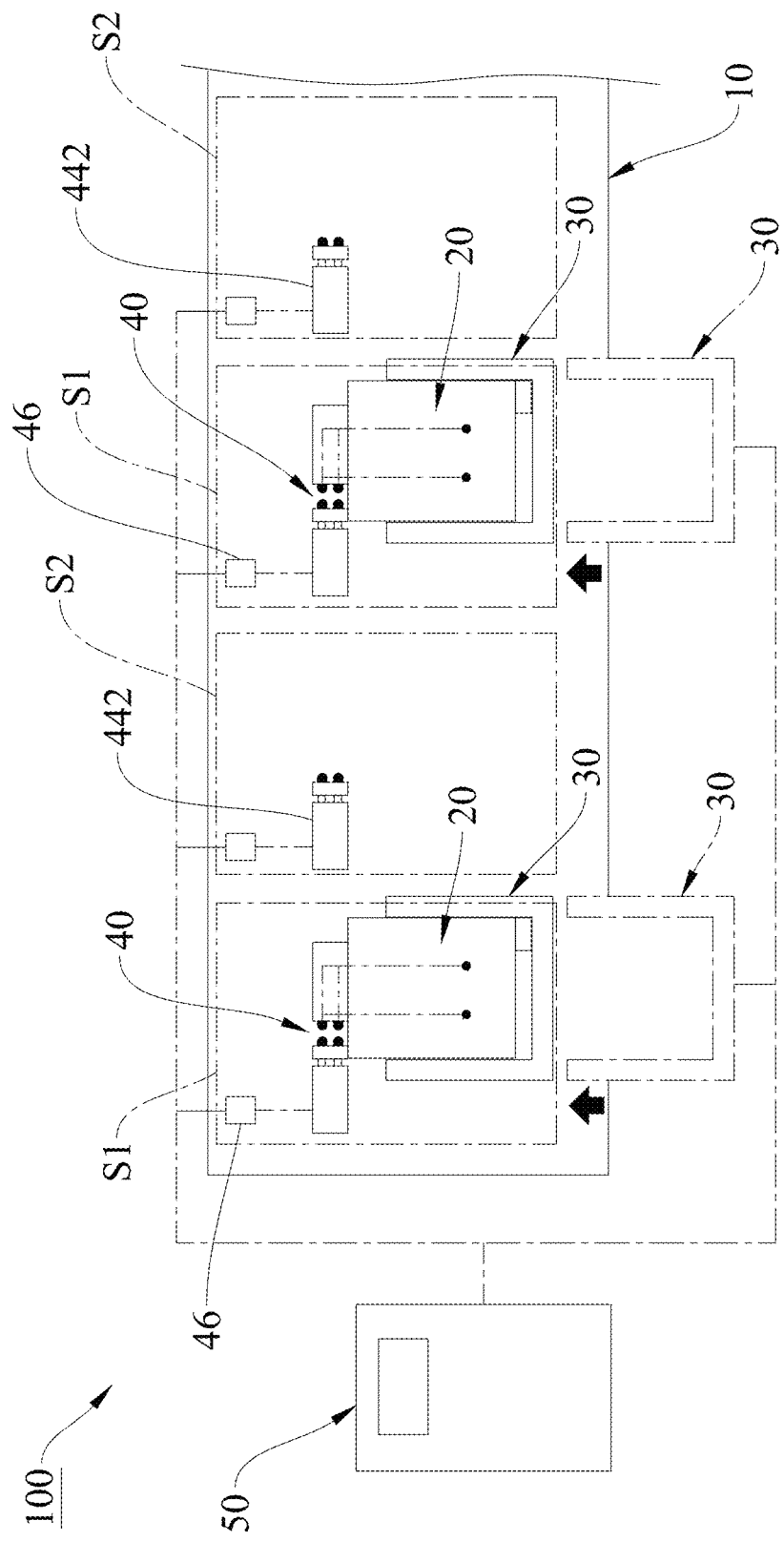
FIG. 8 is a schematic view of the apparatus for manufacturing the shoe material according to the embodiment of the present invention, showing that the mold moving mechanism is engaged with the mold.

Afterward, the central controller 50 sends a first control command O1 according to the first control signal C1 to drive the contacting points 442a of the device end base 442 to move backward, so that the contacting points 442a of the device end base 442 are not in contact with the contacted points 441a of the mold end base 441 (shown in FIG. 4); meanwhile, the mold moving mechanism 30 is controlled to move and to be engaged with the mold 20 (shown in FIG. 8), and the mold moving mechanism 30 further moves the mold 20 in the hot-press molding station S1 to the cooling shaping station S2. Then, the contacting points 442a fixed on the device 10 and located at the device end base 442 of the cooling shaping base S2 is controlled to move forward to be in contact with the contacted points 441a of the mold end base 441 on the mold 20; at that time, the central controller 50 compares the real-time temperature CTi measured by the temperature-sensing rod 42 with the second temperature threshold T2 stored; when the real-time temperature CTi is less than the second temperature threshold T2, the temperature of the middle of the maximum thickness D of the foamed shoe material A has been reduced to be below the temperature of solidifying the material and the foamed shoe material A has been shaped; thus, the central controller 50 sends a second control signal C2 to stop the cooling process on the mold 20 by the device 10 and simultaneously sends a second control command O2 according to the second control signal C2 to break the electrical connection between the contacting points 442a and the contacted points 441a and to control the mold moving mechanism 30 to move the mold 20 located at the cooling shaping station S2 to the subsequent processing station for opening the mold 20 and taking out the shaped foamed shoe material A, that is, the midsole.

With the real-time temperature measuring system 40, the method for manufacturing the shoe material and the apparatus for manufacturing the shoe material of the present invention could effectively measure the real-time temperature inside the foamed shoe material A in the mold 20 of the hot-press molding station S1 and/or the cooling shaping station S2, so that the temperature controlling process could be controlled effectively and the mold 20 could be moved timely, thereby resolving the problem of the conventional way that the productivity is reduced and the energy consumption of the device is increased due to the increased heating time and/or the increased cooling time for ensuring the production quality. Therefore, the present invention could not only reduce the manufacturing time of the shoe material in the hot-press molding process and the cooling shaping process, but could also improve the production efficiency and reduce the energy consumption of the device.

In addition, it is worth mentioning that when the mold 20 in the hot-press molding station S1 is moved to the cooling shaping station S2, another batch of a foamed shoe material A requiring hot-press molding and a mold 20 could be timely moved to the hot-press molding station S1 of the device 10 to perform heating and pressing, so that the temperature controlling process could be simultaneously performed on the molds 20 in the cooling shaping station S2 and in the hot-press molding station S1. In this way, when the hot-pressing molding stations S1 and the cooling shaping stations S2 of the device 10 are fully loaded with the molds 20, the device 10 is operated effectively and efficiently, thereby improving the production efficiency and reducing the energy consumption of the device.

Figure 9:
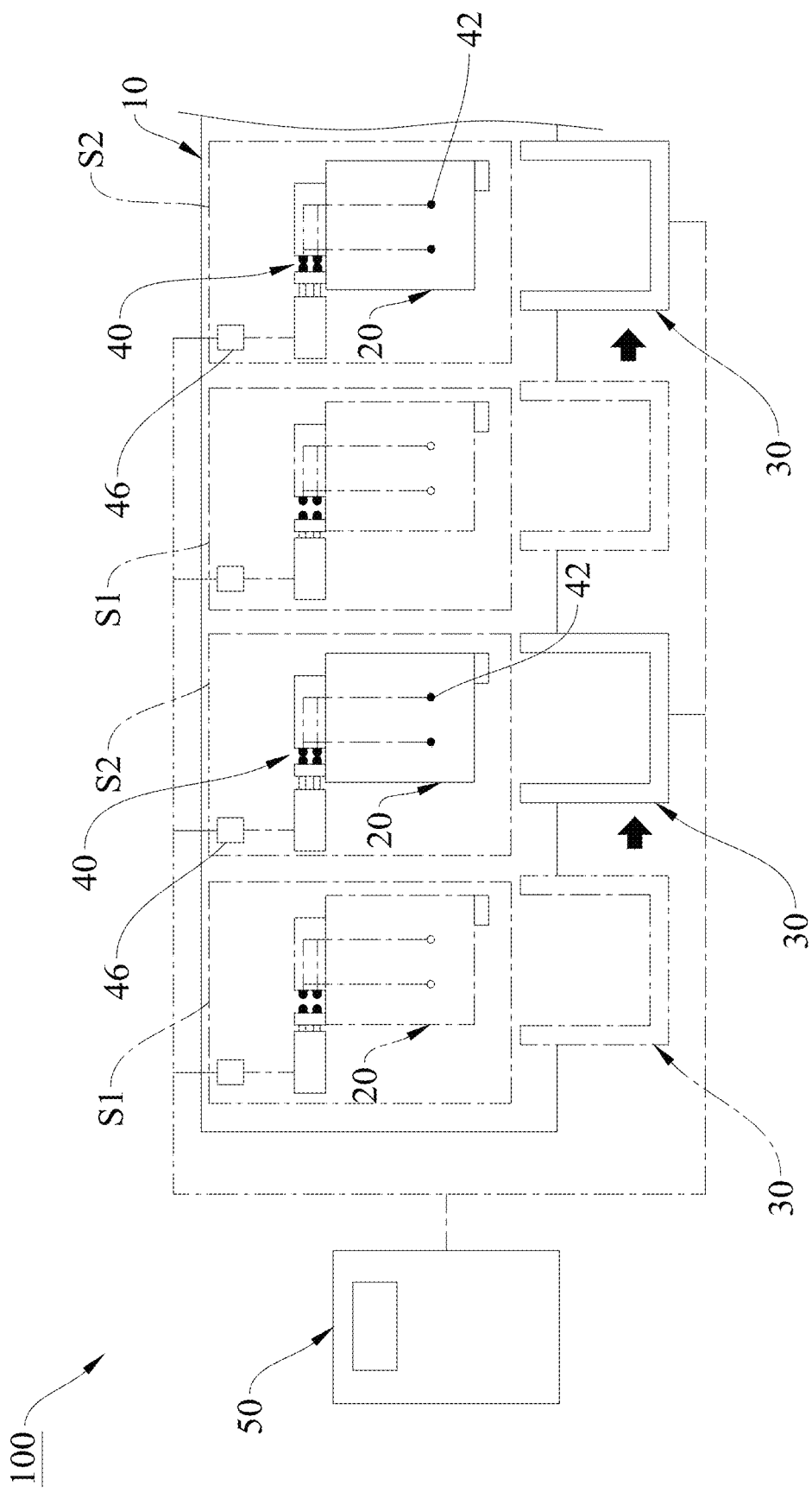
FIG. 9 is a schematic view of the apparatus for manufacturing the shoe material according to the embodiment of the present invention, showing that the mold is moved to the cooling shaping station.
Figure 10:
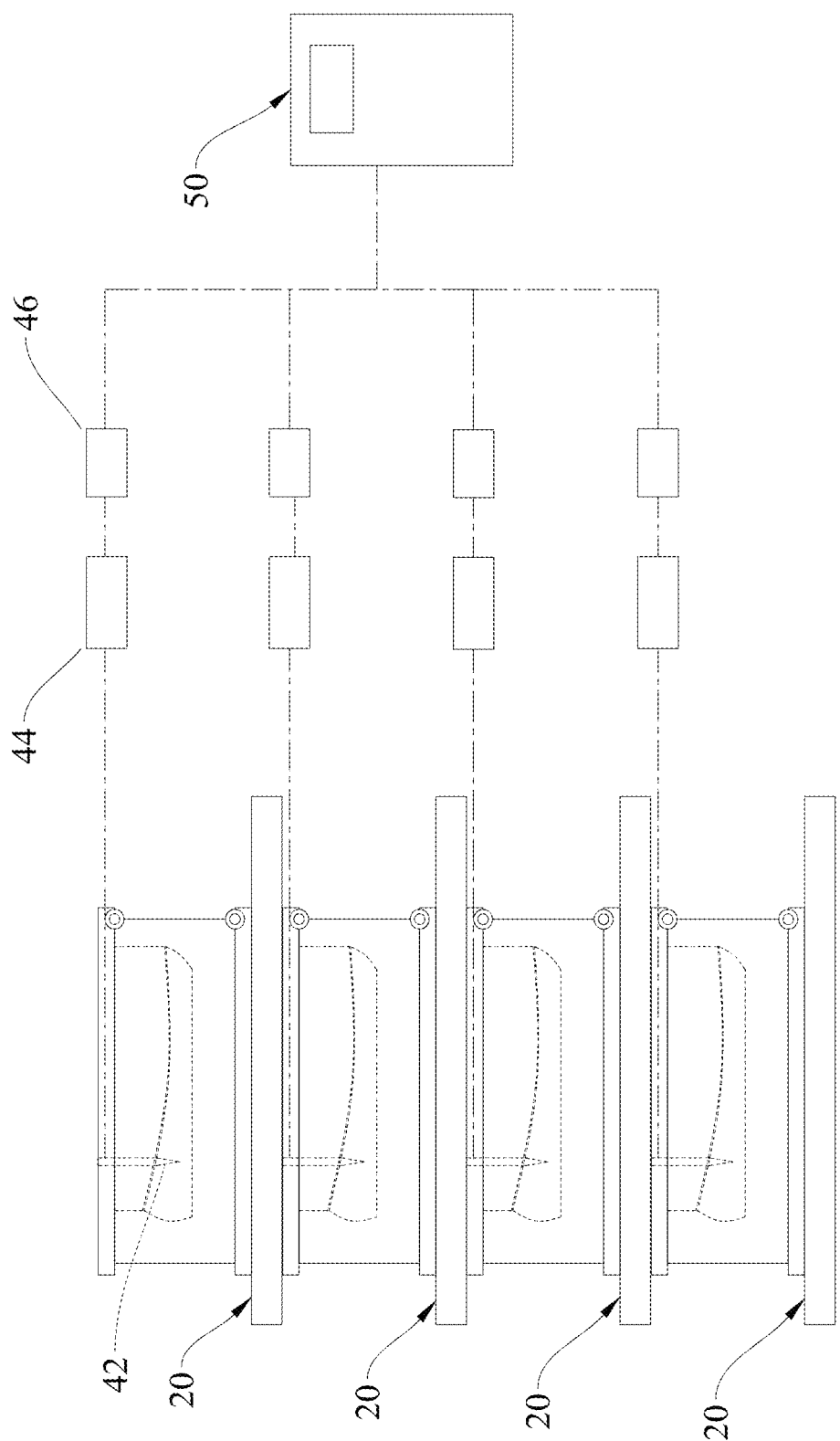
FIG. 10 is a schematic view, showing that the molds are stacked according to the embodiment of the present invention.

In the above description, the number of mold 20 mounted on the hot-press molding station S1 and the cooling shaping station S2 is one as an example. However, in practice, the number of molds mounted on the work stations could be plural and stacked for maximizing the production efficiency. As shown in FIG. 10, a plurality of molds 20 are vertically stacked; each of the molds 20 is provided with a temperature-sensing rod 42, wherein the temperature-sensing rod 42 of each of the molds 20 is connected to a signal connecting mechanism 44; the signal connecting mechanism 44 could be electrically connected to a temperature capturing module 46 in a controllably manner, and a temperature signal could be sent to the central controller 50 for determination and control. In addition, referring to FIG. 8 and FIG. 9, the mold moving mechanism 30 is arranged on the same side of placing or taking out the molded product (i.e., arranged in front of the device 10) and is movable among different processing stations; the mold moving mechanism 30 could also be arranged on a side opposite to the side of placing or taking out the molded product (i.e., arranged behind the device 10) and is movable among the different processing stations. The way of moving the mold 20 by the mold moving mechanism 30 includes mechanical ways (such as clamping, hooking, and pushing) or magnetic force, but not limited thereto.

It must be pointed out that the embodiments described above are only some preferred embodiments of the present disclosure. All equivalent structures which employ the concepts disclosed in this specification and the appended claims should fall within the scope of the present disclosure.

What is claimed is:

1. A real-time temperature measuring system for manufacturing a shoe material and configured to measure a real-time temperature inside a foamed shoe material in a mold while a device performs a temperature controlling process on the mold; the real-time temperature measuring system electrically connected to a central controller, comprising:
   at least one temperature-sensing rod configured to measure the real-time temperature inside the foamed shoe material while the mold is closed; and
   a signal connecting mechanism comprising a mold end base and a device end base, wherein the mold end base is engaged with the mold and has at least one contacted point electrically connected to the at least one temperature-sensing rod; the device end base is disposed on the device and has at least one contacting point, wherein the at least one contacting point is electrically connected to the central controller and is controlled to move between a first position and a second position; when the at least one contacting point is located at the first position, the at least one contacting point is not in contact with the at least one contacted point; when the at least one contacting point is located at the second position, the at least one contacting point is in contact with the at least one contacted point.

2. The real-time temperature measuring system as claimed in claim 1, comprising a temperature capturing module electrically connected to the at least one contacting point of the device end base and the central controller, wherein the central controller stores at least one temperature threshold and compares the real-time temperature measured by the at least one temperature-sensing rod with the at least one temperature threshold; when the real-time temperature is greater than or is less than the at least one temperature threshold, the central controller sends a control signal, and the device stops the temperature controlling process on the mold according to the control signal.

3. The real-time temperature measuring system as claimed in claim 1, wherein the at least one temperature-sensing rod comprises a heat-insulating sleeve and a thermocouple; the heat-insulating sleeve is detachably fixed on an inner surface of a mold cover of the mold or a surface of at least one mold cavity of the mold; the thermocouple penetrates through the heat-insulating sleeve, wherein an end of the thermocouple is electrically connected to the at least one contacted point of the mold end base, and another end of the thermocouple extends out of the heat-insulating sleeve; the heat-insulating sleeve and the thermocouple penetrate through a surface of the foamed shoe material; the thermocouple is in contact with the foamed shoe material and is configured to measure the real-time temperature inside the foamed shoe material.

4. The real-time temperature measuring system as claimed in claim 3, wherein the foamed shoe material has a maximum thickness; the heat-insulating sleeve and the thermocouple penetrate through the surface of the foamed shoe material to extend into 20% to 80% of the maximum thickness and to measure the real-time temperature inside the foamed shoe material.

5. The real-time temperature measuring system as claimed in claim 4, wherein the heat-insulating sleeve and the thermocouple penetrate through the surface of the foamed shoe material to extend into 40% to 60% of the maximum thickness and to measure the real-time temperature inside the foamed shoe material.

6. The real-time temperature measuring system as claimed in claim 1, wherein the device end base comprises at least one moving rod; the at least one moving rod is movable between the first position and the second position, wherein an end of the at least one moving rod is connected to the at least one contacting point.

7. The real-time temperature measuring system as claimed in claim 1, wherein the mold end base is detachably engaged with the mold.

8. An apparatus for manufacturing a shoe material with a real-time temperature measuring system, comprising:
   a device provided with at least one work station;
   at least one mold mounted on the at least one work station of the device and comprising at least one mold cavity and a mold cover configured to open or cover the at least one mold cavity;
   the at least mold cavity is configured to dispose a foamed shoe material; the at least one mold is controlled to perform a temperature controlling process on the foamed shoe material;
   at least one real-time temperature measuring system, comprising:
   at least one temperature-sensing rod disposed on an inner surface of the mold cover of the at least one mold or a surface of the at least one mold cavity of the at least one mold; when the mold cover covers the at least one mold cavity, the at least one temperature-sensing rod is inserted into the foamed shoe material and measures a real-time temperature of the foamed shoe material;
   a signal connecting mechanism comprising a mold end base and a device end base, wherein the mold end base is engaged with the at least one mold and has at least one contacted point electrically connected to the at least one temperature-sensing rod; the device end base is disposed on the device and has at least one contacting point, wherein the at least one contacting point is controlled to move between a first position and a second position; when the at least one contacting point is located at the first position, the at least one contacting point is not in contact with the at least one contacted point; when the at least one contacting point is located at the second position, the at least one contacting point is in contact with the at least one contacted point; and
   a temperature capturing module electrically connected to the at least one contacting point of the device end base and comprising a temperature analysis chip; when the at least one contacting point of the device end base is in contact with the at least one contacted point of the mold end base, the temperature capturing module converts an electrical signal measured by the at least one temperature-sensing rod into a temperature signal through the temperature analysis chip and sends the temperature signal;

a central controller configured to receive the temperature signal sent by the temperature capturing module; the central controller stores at least one temperature threshold and compares the real-time temperature measured by the at least one temperature-sensing rod with the at least one temperature threshold; when the real-time temperature is greater than or is less than the at least one temperature threshold, the central controller sends a control signal to stop the temperature controlling process on the at least one mold.

9. The apparatus for manufacturing the shoe material as claimed in claim 8, wherein the at least one work station of the device comprises a hot-press molding station and a cooling shaping station; the at least one temperature threshold of the central controller includes a first temperature threshold corresponding to the hot-press molding station and a second temperature threshold corresponding to the cooling shaping station, wherein the first temperature threshold is greater than the second temperature threshold; when the central controller determines that the real-time temperature of the foamed shoe material of the hot-press molding station is greater than the first temperature threshold, the control signal sent by the central controller is defined as a first control signal; when the central controller determines that the real-time temperature of the foamed shoe material of the cooling shaping station is less than the second temperature threshold, the control signal sent by the central controller is defined as a second control signal; the central controller sends a first control command according to the first control signal to control a mold moving mechanism to move the at least one mold to the cooling shaping station; the central controller sends a second control command according to the second control signal to control the mold moving mechanism to move the at least one mold to a subsequent processing station.

10. The apparatus for manufacturing the shoe material as claimed in claim 8, wherein the at least one temperature-sensing rod comprises a heat-insulating sleeve and a thermocouple; the heat-insulating sleeve is detachably fixed on the inner surface of the mold cover or the surface of the at least one mold cavity; the thermocouple penetrates through the heat-insulating sleeve, wherein an end of the thermocouple is electrically connected to the at least one contacted point of the mold end base, and another end of the thermocouple extends out of the heat-insulating sleeve to be in contact with the foamed shoe material and is configured to measure the real-time temperature of the foamed shoe material.

11. The apparatus for manufacturing the shoe material as claimed in claim 10, wherein the heat-insulating sleeve and the thermocouple penetrate through a surface of the foamed shoe material to extend into the foamed shoe material and to measure the real-time temperature inside the foamed shoe material.

12. The apparatus for manufacturing the shoe material as claimed in claim 11, wherein the foamed shoe material has a maximum thickness; the heat-insulating sleeve and the thermocouple penetrate through the surface of the foamed shoe material to extend into 20% to 80% of the maximum thickness and to measure the real-time temperature inside the foamed shoe material.

13. The apparatus for manufacturing the shoe material as claimed in claim 12, wherein the heat-insulating sleeve and the thermocouple penetrate through the surface of the foamed shoe material to extend into 40% to 60% of the maximum thickness and to measure the real-time temperature inside the foamed shoe material.

14. The apparatus for manufacturing the shoe material as claimed in claim 8, wherein the device end base comprises at least one moving rod; the at least one moving rod is movable between the first position and the second position, wherein an end of the at least one moving rod is connected to the at least one contacting point.

15. The apparatus for manufacturing the shoe material as claimed in claim 8, wherein the mold end base is detachably engaged with the at least one mold.

16. A method for manufacturing a shoe material, configured to perform hot-press molding and cooling shaping on a foamed shoe material, comprising:
step A: obtaining the foamed shoe material with a skin layer of the foamed shoe material removed;
step B: placing the foamed shoe material in a mold of a hot-press molding station of a device and performing hot-press molding, wherein the mold comprises at least one temperature-sensing rod disposed on an inner surface of a mold cover of the mold or a surface of at least one mold cavity of the mold;
step C: penetrating a surface of the foamed shoe material by the temperature-sensing rod, thereby the temperature-sensing rod extends into the foamed shoe material and measures a real-time temperature inside the foamed shoe material;
step D: determining whether the real-time temperature in step C is greater than a first temperature threshold and sending a first control signal to stop heating the mold when the real-time temperature in step C is greater than the first temperature threshold;
step E: sending a first control command according to the first control signal; the first control command controls a mold moving mechanism to move the mold from the hot-press molding station to a cooling shaping station of the device;
step F: measuring the real-time temperature inside the foamed shoe material in the mold located in the cooling shaping station;
step G: determining whether the real-time temperature in step F is less than a second temperature threshold and sending a second control signal to stop cooling the mold when the real-time temperature in step F is less than the second temperature threshold; and
step H: sending a second control command according to the second control signal; the second control command controls the mold moving mechanism to move the mold from the cooling shaping station to a subsequent processing station.

17. The method for manufacturing the shoe material as claimed in claim 16, wherein the foamed shoe material has a maximum thickness; the temperature-sensing rod penetrates through the surface of the foamed shoe material to extend into 20% to 80% of the maximum thickness and to measure the real-time temperature inside the foamed shoe material.

18. The method for manufacturing the shoe material as claimed in claim 16, wherein the first temperature threshold and the second temperature threshold are determined by differential scanning calorimetry.

* * * * *